(12) United States Patent
Yang et al.

(10) Patent No.: US 12,554,050 B2
(45) Date of Patent: Feb. 17, 2026

(54) OPTICAL FILMS WITH INFRARED FILTERS

(71) Applicant: 3M INNOVATIVE PROPERTIES COMPANY, St. Paul, MN (US)

(72) Inventors: Zhaohui Yang, North Oaks, MN (US); Raghunath Padiyath, Woodbury, MN (US); John A. Wheatley, Stillwater, MN (US); Ryan T. Fabick, Shoreview, MN (US); Bryan V. Hunt, Nowthen, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 849 days.

(21) Appl. No.: 17/893,380

(22) Filed: Aug. 23, 2022

(65) Prior Publication Data
US 2023/0081992 A1 Mar. 16, 2023

Related U.S. Application Data

(60) Provisional application No. 63/260,765, filed on Aug. 31, 2021.

(51) Int. Cl.
*G02B 5/20* (2006.01)
*G01S 17/04* (2020.01)
*G02B 5/28* (2006.01)
*G06V 40/13* (2022.01)

(52) U.S. Cl.
CPC ............. *G02B 5/208* (2013.01); *G01S 17/04* (2020.01); *G02B 5/282* (2013.01); *G02B 5/287* (2013.01); *G06V 40/1318* (2022.01)

(58) Field of Classification Search
CPC ........ G02B 5/208; G02B 5/287; G02B 5/282; G01S 17/04; G06V 40/1318
USPC .......................................................... 359/359
See application file for complete search history.

(56) References Cited

U.S. PATENT DOCUMENTS

2003/0224182 A1* 12/2003 Simpson ................ G02B 5/208
428/437
2018/0067245 A1* 3/2018 Giachino .............. G01J 1/0418

FOREIGN PATENT DOCUMENTS

KR 20080012309 A * 2/2008 ............ H10N 30/857

* cited by examiner

*Primary Examiner* — William R Alexander
*Assistant Examiner* — Alaina Marie Swanson
(74) *Attorney, Agent, or Firm* — Clifton F. Richardson

(57) ABSTRACT

An optical film includes a plurality of first layers disposed on a plurality of second layers. For each angle of incidence in an incident angle range of 0-50 degrees, an optical transmittance of each of the optical film and the plurality of second layers versus wavelength includes a band edge disposed in a transition wavelength range separating a visible wavelength range where the optical film and the plurality of second layers have respective average optical transmittances Tv and Tv2 from an infrared wavelength range where the optical film and the plurality of second layers have respective average optical transmittances Ti and Ti2. Each of Tv and Tv2 is greater than about 30%. An average value of Tv2 is greater than an average value of Tv by at least 5%. An average value of Ti is less than an average value of Ti2 by at least 20%.

15 Claims, 5 Drawing Sheets

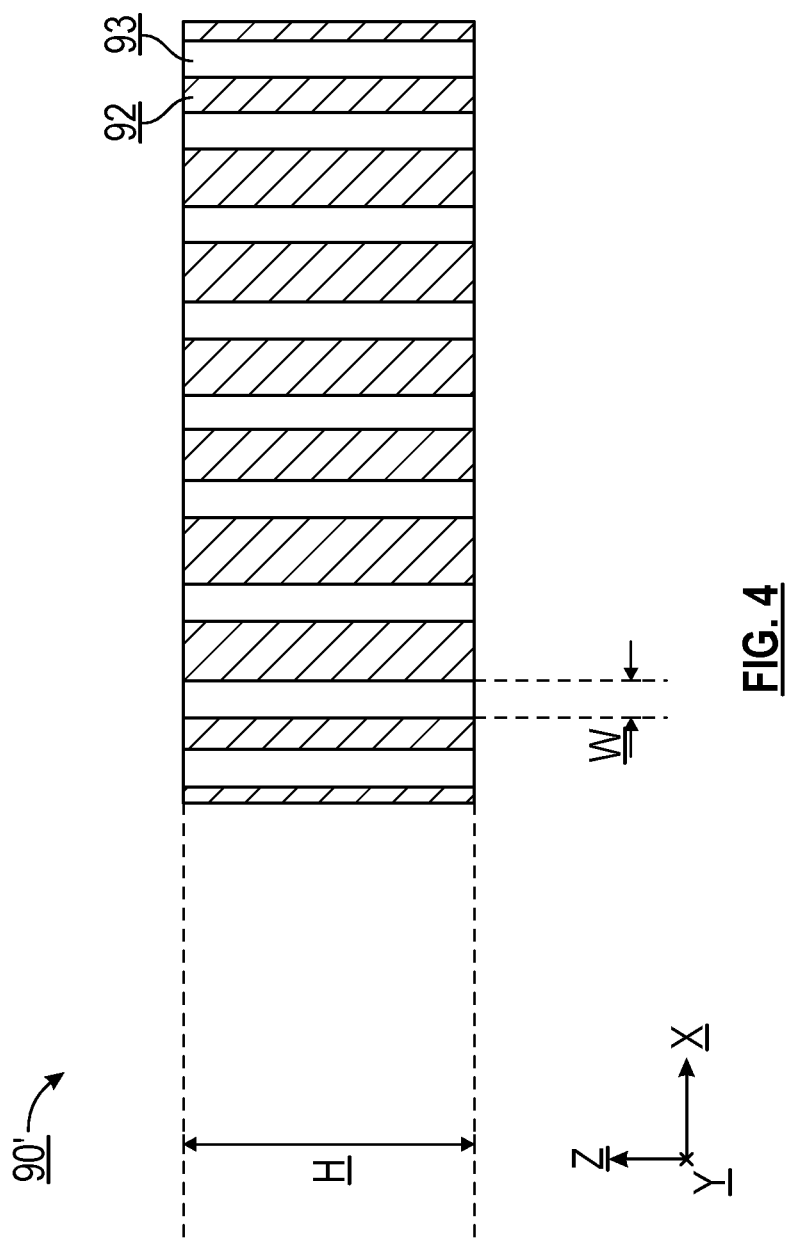

OPTICAL FILMS WITH INFRARED FILTERS

TECHNICAL FIELD

The disclosure generally relates to optical constructions, particularly optical constructions including multilayer optical films and broad band infrared filters.

BACKGROUND

In recent years, optical technology has advanced significantly and has been used in almost every aspect of human life. Optical image sensors find widespread applications including consumer electronics, automation and transportation. One application is the behind-screen fingerprint sensor for consumer electronics. Collimation optics attached to a sensor array controls the imaging point spread function by filtering off high angle light and only allowing low angle light to pass through, enabling sufficient image resolution. In an OLED display system design, the visible light from the display panel illuminates the finger for sensor signal. In some cases, optical films used in outdoor displays exposed to strong ambient light, may include infrared (IR) filters that reflect wavelengths of the ambient light in the infrared region to reduce the ambient light noise while allowing visible light to pass through.

SUMMARY

Some aspects of the disclosure relate to an optical film including a plurality of first layers numbering N1 in total disposed on a plurality of polymeric second layers numbering N2 in total, where N1≥2, N1≤50, N2-N1>10. Each of the first and second layers have an average thickness of less than about 500 nm. Each of at least 30% of the first layers includes at least 30% by weight of an inorganic material. For an incident light incident in an incident plane, non-overlapping visible, transition, and infrared wavelength ranges and for each angle of incidence in an incident angle range extending from about zero degree to at least about 50 degrees, an optical transmittance of each of the optical film and the plurality of polymeric second layers versus wavelength includes a band edge disposed substantially in the transition wavelength range and separating the visible wavelength range where the optical film and the plurality of polymeric second layers have respective average optical transmittances Tv and Tv2 from the infrared wavelength range where the optical film and the plurality of polymeric second layers have respective average optical transmittances Ti and Ti2. Each of Tv and Tv2 is greater than about 30% and, in the incident angle range, an average value of Tv2 is greater than an average value of Tv by at least 5%, and an average value of Ti is less than an average value of Ti2 by at least 20%.

Some other aspects of the disclosure relate to an optical system including a display having a plurality of light emitting pixels and configured to display an image for viewing by a viewer. An optical sensor is disposed proximate the display and a lens film having a plurality of microlenses is disposed between the display and the optical sensor. A light absorbing layer is disposed between the lens film and the optical sensor and defines a plurality of openings therein. The openings are aligned to the microlenses in a one-to-one correspondence. The optical film according to one or more embodiments are disposed between the display and the optical sensor.

Some other aspects of the disclosure relate to an optical system including a display having a plurality of light emitting pixels and configured to display an image for viewing by a viewer. An optical sensor is disposed proximate the display. A light absorbing layer is disposed between the lens film and the optical sensor and defines a plurality of optically transparent openings therein. An optical construction is disposed between the light absorbing layer and the optical sensor and includes a plurality of first layers numbering N1 in total, N1 greater than 2 and less than 50. A plurality of polymeric second layers numbering N2 in total, N2-N1>10. Each of the first and second layers have an average thickness of less than about 500 nm. Each of at least 30% of the first layers including at least 30% by weight of an inorganic material. For an incident light incident in an incident plane, optical transmittances of each of the plurality of polymeric second layers and the optical construction versus wavelength include a band edge that is within a same transition wavelength range that is between about 50 nm and 400 nm wide as the incident angle increases from about zero degree to at least about 50 degrees. For at least a same first wavelength in the transmission wavelength range and a same first incident angle of greater than about 40 degrees, the plurality of polymeric second layers and the optical construction have respective optical transmittances T1 and T2, where T2 is less than T1 by at least 20%.

Some other aspects of the disclosure relate to outdoor displays having a display system according to one or embodiments of the disclosure.

BRIEF DESCRIPTION OF DRAWINGS

The various aspects of the disclosure will be discussed in greater detail with reference to the accompanying figures where, FIG. 1 schematically shows an optical film including an IR film and a multilayer optical film (MOF) according to some embodiments of the disclosure;

FIG. 4 schematically shows the construction of a light absorbing layer of the optical system according to some embodiments The figures are not necessarily to scale. Like numbers used in the figures refer to like components. However, it will be understood that the use of a number to refer to a component in a given figure is not intended to limit the component in another figure labelled with the same number.

DETAILED DESCRIPTION OF ILLUSTRATIVE EMBODIMENTS

In the following description, reference is made to the accompanying drawings that form a part hereof and in which various embodiments are shown by way of illustration. It is to be understood that other embodiments are contemplated and may be made without departing from the scope or spirit of the present description. The following detailed description, therefore, is not to be taken in a limiting sense.

IR rejection filters, especially interference-based IR filters such as 3M™ MOF filters, have high efficiency (low transmission) to block the unwanted spectrum at close to the normal incidence angle. The band edge shifts significantly as the angle of incident increases, and the IR rejection function diminishes. Typically, a collimation film introduces (or leaks) some high angle light from internal scattering, which is more difficult to be filtered out by the IR rejection filter. The embodiments disclosed herein addresses these and other challenges.

Some embodiments of the disclosure relate to a hybrid spectral filter having a sharp left band edge at around 600 nm, and a wide block band of more than 500 nm. In some aspects, the spectral filter is a thin IR spectral filter of less than about 50 um total thickness.

Figure 1:
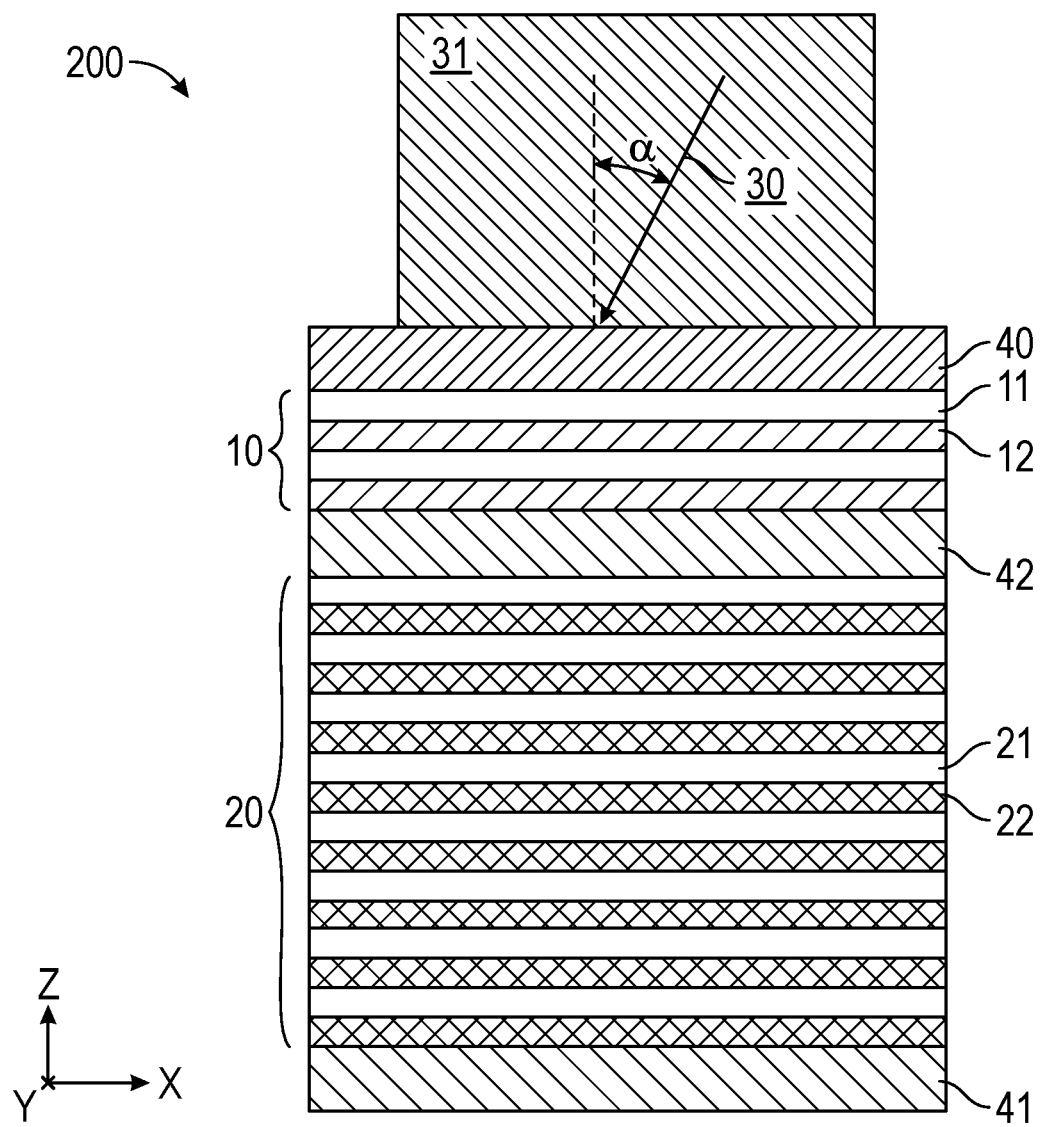

Some embodiments of an optical film (200) including a plurality of first layers (10) and a plurality of polymeric second layers (20) are shown in FIG. 1. In some aspects, the plurality of first layers (10) numbering N1 in total may be disposed on the plurality of polymeric second layers (20) numbering N2 in total. In some cases, N1≥2, or ≥3, or ≥4, or ≥5, or ≥6, or ≥7, or ≥8. In some cases, N1≤50, or ≤45, or ≤40, or ≤35, or ≤30, or ≤25, or ≤20, or ≤15. In some cases, N2-N1>10, or >20, or >30, or >40, or >50, or >75, or >100, or >125, or >150, or >200, or >300.

Each of the first and second layers may have an average thickness of less than about 500 nm, or less than about 400 nm, or less than about 300 nm, or less than about 200 nm. Each of at least 30%, or 40%, or 50%, or 60%, or 70%, or 80%, or 90%, or 100% of the first layers (10) may include at least 30%, or 40%, or 50%, or 60%, or 70%, or 80%, or 90%, or 95% by weight of an inorganic material. In some aspects, the plurality of first layers (10) may include a plurality of alternating A layers (11) and B layers (12). Each of the A layers may include the at least 30%, or 40%, or 50%, or 60%, or 70%, or 80%, or 90%, or 95% by weight of the inorganic material. The inorganic material, for instance, may include silver. In some aspects, the plurality of first layers (10) of the optical film (200) may be configured as an IR reflector film and the plurality of polymeric second layers (20) of the optical film (200) may be configured as a multilayer optical film (MOF).

In some embodiments, the first layers (10) may include metal-dielectric stacks which are useful as infrared-rejecting functional layers. These stacks may include alternating layers of metal and metal oxides such as indium oxide, indium tin oxide, hafnium oxide, zinc tin oxide, and others. Typically, a stack of two or three metal layers and three or four oxide layers are used in these applications to obtain the desired light transmission in the visible and desired reflection in the infrared portion of the electromagnetic spectrum. In some aspects, the metal layers may include elemental or alloyed silver, copper or gold and the According to some embodiments of the disclosure the combination of polymeric multi-layer films designed as infrared reflectors and metal-dielectric stacks achieves a broad band infrared filter that maintains a desired level of IR rejection over a wide incident angle range.

In some cases, the optical film may further include one or more polymeric skin layers (40, 41) disposed on the plurality of optical film (200). Each of the skin layers (40, 41) may have an average thickness of greater than about 500 nm, or greater than 750 nm, or greater than 1000 nm, or greater than 1250 nm, or greater than 1500 nm. The skin layers (40, 41) and the plurality of first and second layers (10, 20) may be bonded with each other using adhesives. The skin layers (40, 41), for instance, may be made of polycarbonate or polycarbonate alloy, or polyethylene terephthalate (PET), or polystyrene (PS), or a combination thereof. In some embodiments, a further skin layer (42) may be disposed between the plurality of first layers (10) and the plurality of polymeric second layers (20).

In some embodiments, the plurality of polymeric second layers (20) may include a plurality of alternating polymeric different first (21) and second (22) layers. For instance, the polymeric second layers (20) may include alternating first (21) and second (22) polymeric layers including at least one birefringent polymer (e.g. oriented semi-crystalline polymer) and one second polymer.

In other embodiments, the materials of first and second layers (21, 22) in the plurality of polymeric second layers (20) may be composed of polymers such as polyesters. For instance, an exemplary polymer useful as a first birefringent layer (21) may be polyethylene naphthalate (PEN). Other semicrystalline polyesters suitable as birefringent polymers as the first birefringent layer (21) in the multilayer polymeric film may include, for example, polybutylene 2,6-naphthalate (PBN), polyethylene terephthalate (PET), or the like. The second layer (22) can be made from a variety of polymers having glass transition temperatures compatible with that of the first birefringent polymer layer (21) and having a refractive index similar to the isotropic refractive index of the first birefringent polymer layer (21). Examples of other polymers suitable for use in optical films and, particularly, in the second polymer layer (22) may include vinyl polymers and copolymers made from monomers such as vinyl naphthalenes, styrene, maleic anhydride, acrylates, and methacrylates Examples of such polymers for the second polymer layer (22) include polyacrylates, polymethacrylates, such as poly methyl methacrylate (PMMA), and isotactic or syndiotactic polystyrene. Other polymers include condensation polymers such as polysulfones, polyamides, polyurethanes, polyamic acids, and polyimides. In addition, the second polymer layer (22) can be formed from homopolymers and copolymers of polyesters, polycarbonates, fluoropolymers, and polydimethylsiloxanes, and blends thereof. The layers can be selected to achieve the reflection of a specific bandwidth of electromagnetic radiation.

In one embodiment, the materials of the plurality of polymeric second layers (20) may have differing indices of refraction. In some embodiments, the plurality of polymeric second layers (20) may include PET as the first layer (21) and co polymers of PMMA (coPMMA), or any other polymer having low refractive index, including copolyesters, fluorinated polymers or combinations thereof as the second layer (22).

Figure 2A:
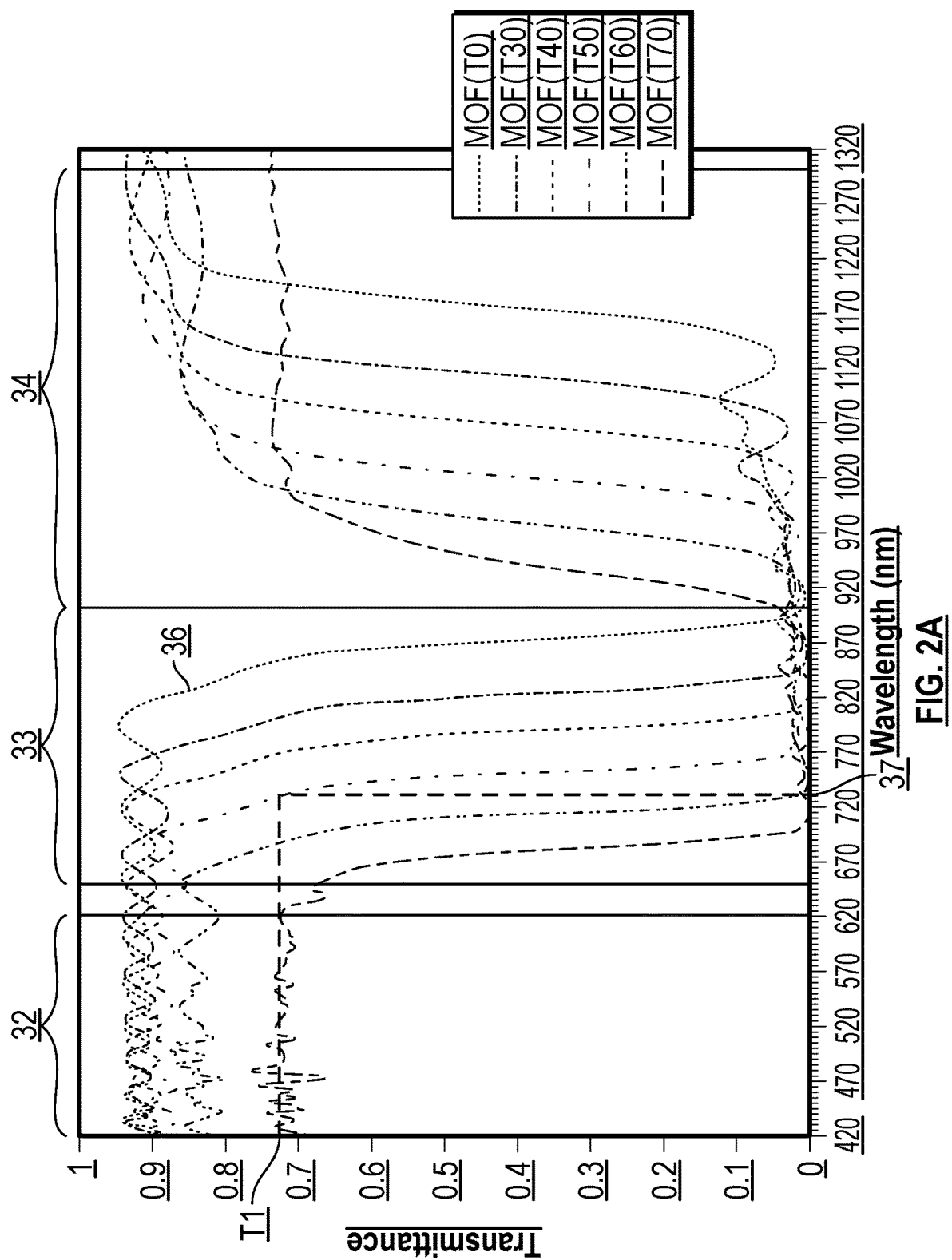
FIG. 2A shows the optical transmittance of the MOF at different incident angles according to some embodiments of the disclosure.
Figure 2B:
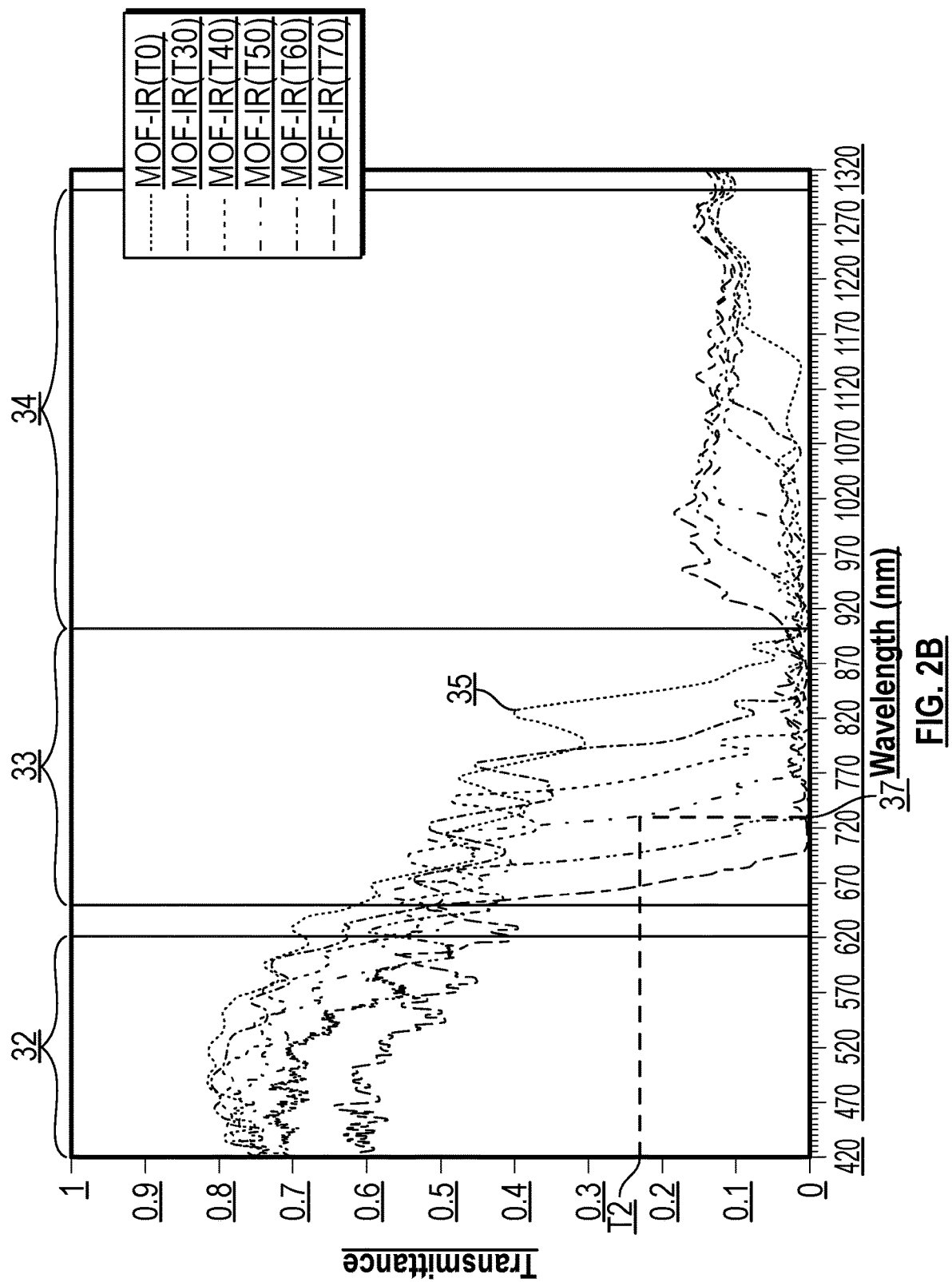
FIG. 2B shows the optical transmittance of the optical film including an IR film and the MOF at different incident angles according to some embodiments of the disclosure.

Incident light (30) incident in an incident plane (31) is polarized along each of mutually orthogonal in-plane first (x-axis) and second (y-axis) directions. FIG. 2A shows the optical transmittance of the plurality of polymeric second layers (20) at different incident angles and at different wavelengths according to some embodiments of the disclosure. FIG. 2B shows the optical transmittance of the plurality of the optical film (200) including the plurality of first layers (10) and a plurality of polymeric second layers (20) at different incident angles and at different wavelengths according to some embodiments of the disclosure.

The electromagnetic spectrum includes non-overlapping visible (32), transition (33) and infrared (34) wavelength ranges. The visible wavelength range (32) extends from about 420-620 nm, the infrared wavelength range (34) extends from about 900-1300 nm, and the transition wavelength range (33) extends from about 650-900 nm separating the visible wavelength range (32) from the infrared wavelength range (34).

As shown in FIG. 2B, for each angle of incidence (α) in an incident angle range extending from about zero degree to at least about 50 degrees, or 55 degrees, or 60 degrees, or 65 degrees, or 70 degrees, the optical transmittance of the optical film (200) versus wavelength includes a band edge (35) disposed substantially in the transition wavelength range (33). Further, as shown in FIG. 2A, for each angle of incidence (a) in an incident angle range extending from about zero degree to at least about 50 degrees, or 55 degrees, or 60 degrees, or 65 degrees, or 70 degrees, the optical transmittance of the plurality of polymeric second layers (20) versus wavelength includes a band edge (36) disposed substantially in the transition wavelength range (33).

In some embodiments, the band edge (35, 36) within a same transition wavelength range (33) of about 650-900 nm may be between about 50 nm and 400 nm wide as the incident angle (a) increases from about zero degree to at least about 50 degrees, or 55 degrees, or 60 degrees, or 65 degrees, or 70 degrees, or 75 degrees, or 80 degrees.

In the visible wavelength range (32), the optical film (200) that includes the plurality of first layers (10) and the plurality of polymeric second layers (20) may have an average optical transmittance Tv. The plurality of polymeric second layers (20) of the optical film may have an average optical transmittance Tv2 in the visible range (32). In some aspects, in the incident angle range extending from about zero degree to at least about 50 degrees, or 55 degrees, or 60 degrees, or 65 degrees, or 70 degrees, the average optical transmittance Tv of the optical film (200) in the visible range (32) and the average optical transmittance Tv2 of the plurality of polymeric second layers (20) in the visible range (32) may be greater than about 30%. In some cases, each of Tv and Tv2 may be greater than about 35%, or greater than about 40%, or greater than about 45%, or greater than about 50%, or greater than about 55%. For instance, in the incident angle range, an average value of Tv2 may be greater than an average value of Tv by at least 5%, or by at least 7.5%, or by at least 10%, or by at least 12.5%, or by at least 15%.

Further, in the infrared wavelength range (34) the optical film (200) that includes the plurality of first layers (10) and the plurality of polymeric second layers (20) may have an average optical transmittance Ti. The plurality of polymeric second layers (20) of the optical film (200) may have an average optical transmittance Ti2 in the infrared wavelength range (34). In some aspects, an average value of Ti may be less than an average value of Ti2 by at least 20%, or by at least 25%, or by at least 30%, or by at least 35%, or by at least 40%, or by at least 45%, or by at least 50%.

In some embodiments, in the transition wavelength range (33), for each angle of incidence in the incident angle range, the optical film (200) may have an average optical transmittances Tt. And the plurality of polymeric second layers (20) of the optical film (200) may have an average optical transmittances Tt2 in the transition wavelength range (33). In some aspects, for at least one angle in the incident angle range, Tt may be less than Tt2 by at least 10%, or by at least 15%, or by at least 20%, or by at least 25%, or by at least 30%, or by at least 35%, or by at least 40%. Further, in the incident angle range, a maximum variation of Tt may be less than a maximum variation of Tt2 by at least 5%, or at least 10%, or at least 15%, or at least 20%, or at least 25%, or at least 30%, or at least 35%.

In some embodiments, for at least a same first wavelength (37) in the transition wavelength range (33) and a same first incident angle (a) of greater than about 40 degrees, the plurality of polymeric second layers (20) and the optical film (200) may have respective optical transmittances T1 and T2. In some cases, T2 may be less than T1 by at least 20%, or by at least 25%, or by at least 30%, or by at least 35%, or by at least 40%, or by at least 45%.

Table 1 shows the average optical transmittance of the optical film at different angles of incidence in the incident angle range in the visible (Tv), transition (Tt) and infrared (Ti) wavelength ranges represented graphically in FIG. 2B, the optical film including the IR reflector film and the MOF according to one or more embodiments of the disclosure.

TABLE 1

|  | T0 | T30 | T40 | T50 | T60 | T70 | Average Of $T_{avg}$ | Range Of $T_{avg}$ |
|---|---|---|---|---|---|---|---|---|
| $T_{avg}$ (420-600 nm) (Tv) | 0.77 | 0.76 | 0.74 | 0.70 | 0.65 | 0.56 | 0.70 | 0.21 |
| $T_{avg}$ (650-900 nm) (Tt) | 0.36 | 0.28 | 0.23 | 0.17 | 0.11 | 0.05 | 0.20 | 0.30 |
| $T_{avg}$ (900-1300 nm) (Ti) | 0.08 | 0.09 | 0.09 | 0.11 | 0.12 | 0.13 | 0.10 | 0.05 |
| Range (650-900 nm) | 0.60 | 0.54 | 0.55 | 0.58 | 0.54 | 0.49 |  |  |

Table 2 shows the average optical transmittance of the MOF at different angles of incidence in the incident angle range in the visible (Tv2), transition (Tt2) and infrared (Ti2) wavelength ranges represented graphically in FIG. 2A.

TABLE 2

|  | T0 | T30 | T40 | T50 | T60 | T70 | Average Of $T_{avg}$ | Range Of $T_{avg}$ |
|---|---|---|---|---|---|---|---|---|
| $T_{avg}$ (420-600 nm) (Tv2) | 0.92 | 0.92 | 0.91 | 0.89 | 0.84 | 0.72 | 0.87 | 0.20 |
| $T_{avg}$ (650-900 nm) (Tt2) | 0.79 | 0.61 | 0.48 | 0.35 | 0.21 | 0.10 | 0.42 | 0.69 |
| $T_{avg}$ (900-1300 nm) (Ti2) | 0.31 | 0.44 | 0.53 | 0.61 | 0.67 | 0.65 | 0.53 | 0.36 |
| Range (650-900 nm) | 0.93 | 0.94 | 0.93 | 0.91 | 0.86 | 0.67 |  | 0.27 |

For the purpose of examples, the incident light intensity spectrum is taken to be a D65 (standard white light source) intensity spectrum. Reflected color and transmitted color chromaticity coordinates can then be calculated to provide a perceived color, for reflected light and transmitted light. The reflection and transmission of light by the optical film may be measured and the color of the reflected and transmitted light may be calculated in the well-known CIE Lab color space. Since the reflection band shifts as a function of incidence angle (α), the optical film including the infrared reflector layer is responsible for a maximum color shift, which is the largest distance in ab space (ignoring L).

In some embodiments, for a light incident on the optical film (200) from an illuminant D65, the optical film (200) may reflect and transmit the incident light with the reflected and transmitted lights, in the CIE Lab color space. The reflected and transmitted light may have respective "a" colorimetric parameters ar1* and at1* for an incident angle of less than about 10 degrees, or less than about 8 degrees, or less than about 6 degrees, or less than about 4 degrees, or less than about 2 degrees, or less than about 1 degree. Further, the reflected and transmitted light may have respective "a" colorimetric parameters ar2* and at2* for an incident angle of between about 40 degrees and about 60 degrees, or between about 45 degrees and about 55 degrees. In some cases, a magnitude of ar1*-ar2* may be less than about 20, or less than about 18, or less than about 16, or less than about 14, or less than about 12, or less than about 11. A magnitude of at1*-at2* may be less than about 10, or less than about 8, or less than about 6, or less than about 5, or less than about 4.

In some instances, the respective "a" colorimetric parameters ar2* and at2* for reflected and transmitted light for an incident angle of between about 70 degrees and about 85 degrees, or between about 75 degrees and about 85 degrees may be such that a magnitude of art*-ar2* may be less than about 30, or less than about 28, or less than about 26, or less than about 24, or less than about 23, or less than about 22 and a magnitude of at1*-at2* may be less than about 15, or less than about 14, or less than about 13, or less than about 12, or less than about 11, or less than about 10.

In other embodiments, the reflected and transmitted light may have respective "b" colorimetric parameters br1* and bt1* for an incident angle (a) of less than about 10 degrees, or less than about 8 degrees, or less than about 6 degrees, or less than about 4 degrees, or less than about 2 degrees, or less than about 1 degree. Further, the reflected and transmitted light may have respective "b" colorimetric parameters br2* and bt2* for an incident angle (a) of between about 40 degrees and about 60 degrees, or between about 45 degrees and about 55 degrees. In some cases, a magnitude of br1*-br2* may be less than about 30, or less than about 28, or less than about 26, or less than about 25, or less than about 24, or less than about 23. A magnitude of bt1*-bt2* may be less than about 15, or less than about 12, or less than about 10, or less than about 9, or less than about 8.

In some instances, the respective "b" colorimetric parameters br2* and bt2* for reflected and transmitted light for an incident angle of between about 70 degrees and about 85 degrees, or between about 75 degrees and about 85 degrees may be such that a magnitude of br1*-br2* may be less than about 15, or less than about 14, or less than about 13, or less than about 12, or less than about 11, or less than about 10 and a magnitude of bt1*-bt2* may be less than about 10, or less than about 9, or less than about 8, or less than about 7, or less than about 6.

Table 3 shows the colorimetric parameters "a' and "b" of reflected and transmitted light incident on the optical film from an illuminant D65 calculated in the CIE Lab color space at different incident angles (α) in the incident angle range.

| Incident angle (degrees) | at* | bt* | ar* | br* |
|---|---|---|---|---|
| 0 | −7.7806 | −0.5928 | 20.5818 | −4.2721 |
| 10 | −8.1820 | −1.0020 | 21.4407 | −2.9407 |
| 20 | −9.1796 | −2.2608 | 23.5479 | 1.3112 |

-continued

| Incident angle (degrees) | at* | bt* | ar* | br* |
|---|---|---|---|---|
| 30 | −9.4622 | −4.1247 | 23.8655 | 7.7830 |
| 40 | −7.2180 | −5.8858 | 18.8333 | 13.5175 |
| 50 | −4.2465 | −7.7321 | 10.0293 | 18.0958 |
| 60 | −6.7165 | −8.6854 | 10.4140 | 17.7990 |
| 70 | −5.5900 | −8.5376 | 6.4759 | 13.0679 |
| 80 | 1.5811 | −5.7901 | −0.8975 | 5.2040 |

Figure 3:
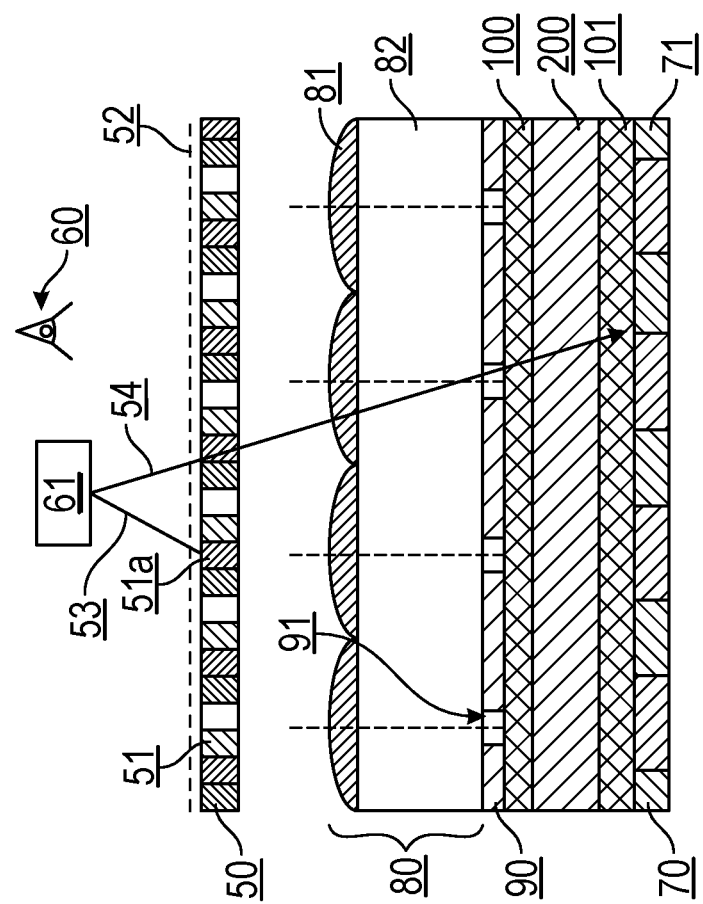
FIG. 3 schematically shows an optical system including the optical film according to some embodiments of the disclosure.

An optical system (300) including the optical construction (200) having a plurality of first layers, for instance, an IR reflector film, disposed on a plurality of polymeric second layers, for instance a multilayer optical film, is shown in FIG. 3. The optical system (300) includes a display (50) having a plurality of light emitting pixels (51) and configured to display an image (52) for viewing by a viewer (60). The display (50) may be a conventional system that projects a visible light beam or image, and may include liquid crystal display (LCD), or organic light emitting display (OLED). In some aspects, the plurality of light emitting pixels (51) may include a plurality of organic light emitting pixels. An optical sensor (70) may be disposed proximate the display (60) and a lens film (80) may be disposed between the display (50) and the optical sensor (70). The lens film (80) may include a plurality of microlenses (81), which may be arranged as a two-dimensional array of microlenses along orthogonal first (x-axis) and second (y-axis). The lens film, in some aspects, may include a support layer (82) supporting the microlenses. The optical sensor may include a plurality of sensor pixels (71). At least one of the light emitting pixels (51a) may be configured to emit light (53) propagating toward and incident on a finger (61) of the viewer. The optical sensor may be configured to at least sense a presence of the finger by receiving at least a portion the incident light after it is reflected (54) by the finger.

A light absorbing layer (90) may be disposed between the lens film (80) and the optical sensor (70). In some aspects, the light absorbing layer (90) may define a plurality of openings (91), or pinholes. In some aspects, the openings (91) may be optically transparent openings. The openings (91) may be aligned to the microlenses (81) in a one-to-one correspondence. In some embodiments, the optical construction (200) of one or more embodiments of the disclosure may be disposed between the display (50) and the optical sensor (70). In some cases, the optical construction (200) of one or more embodiments of the disclosure may be disposed between the light absorbing layer (90) and the optical sensor (70). For instance, as shown in FIG. 3, a first bonding layer (100) may be disposed to bond the optical construction (200) to the light absorbing layer (90) and a second bonding layer (101) may be disposed to bond the optical construction (200) to the optical sensor (70).

In some aspects as shown in FIG. 4, the light absorbing layer (90') may include a plurality of alternating light absorbing (92) and light transmissive (93) regions. Each of the light transmissive regions may include a corresponding one of the optically transparent openings (91). The light transmissive regions has an average height H along a thickness direction (z-axis) of the light absorbing layer (90') and an average largest lateral dimension W along a width direction (x-axis) of the light absorbing layer (90') orthogonal to the thickness direction. In some cases, H/W≥0.5, and in other cases H/W≥2, or ≥3, or ≥4, or ≥5, or ≥10, or ≥20, or ≥50.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An optical film comprising a plurality of first layers numbering N1 in total disposed on a plurality of polymeric second layers numbering N2 in total, N1≥2, N1≤50, N2-N1>10, each of the first and second layers having an average thickness of less than about 500 nm, each of at least 30% of the first layers comprising at least 30% by weight of an inorganic material, such that for an incident light incident in an incident plane, non-overlapping visible, transition, and infrared wavelength ranges: for each angle of incidence in an incident angle range extending from about zero degree to at least about 50 degrees, an optical transmittance of each of the optical film and the plurality of polymeric second layers versus wavelength comprises a band edge disposed substantially in the transition wavelength range and separating the visible wavelength range where the optical film and the plurality of polymeric second layers have respective average optical transmittances Tv and Tv2 from the infrared wavelength range where the optical film and the plurality of polymeric second layers have respective average optical transmittances Ti and Ti2, wherein:
 each of Tv and Tv2 is greater than about 30%; and
 in the incident angle range, an average value of Tv2 is greater than an average value of Tv by at least 5%, and an average value of Ti is less than an average value of Ti2 by at least 20%.

2. The optical film of claim 1, wherein for a light incident on the optical film from an illuminant D65, the optical film reflects and transmits the incident light with the reflected and transmitted lights, in a CIE Lab color space, having respective "a" colorimetric parameters ar1* and at1* for an incident angle of less than about 10 degrees and respective "a" colorimetric parameters ar2* and at2* for an incident angle of between about 40 degrees and about 60 degrees, wherein a magnitude of ar1*-ar2* is less than about 20 and a magnitude of at1*-at2* is less than about 10.

3. The optical film of claim 1, wherein for a light incident on the optical film from an illuminant D65, the optical film reflects and transmits the incident light with the reflected and transmitted lights, in a CIE Lab color space, having respective "a" colorimetric parameters ar1* and at1* for an incident angle of less than about 10 degrees and respective "a" colorimetric parameters ar2* and at2* for an incident angle of between about 70 degrees and about 85 degrees, wherein a magnitude of ar1*-ar2* is less than about 30 and a magnitude of at1*-at2* is less than about 15.

4. The optical film of claim 1, wherein for a light incident on the optical film from an illuminant D65, the optical film reflects and transmits the incident light with the reflected and transmitted lights, in a CIE Lab color space, having respective "b" colorimetric parameters br1* and bt1* for an incident angle of less than about 10 degrees and respective "b" colorimetric parameters br2* and bt2* for an incident angle of between about 40 degrees and about 60 degrees, wherein a magnitude of br1*-br2* is less than about 30 and a magnitude of bt1*-bt2* is less than about 15.

5. The optical film of claim 1, wherein for a light incident on the optical film from an illuminant D65, the optical film reflects and transmits the incident light with the reflected and transmitted lights, in a CIE Lab color space, having respective "b" colorimetric parameters br1* and bt1* for an incident angle of less than about 10 degrees and respective "b" colorimetric parameters br2* and bt2* for an incident angle of between about 70 degrees and about 85 degrees, wherein a magnitude of br1*-br2* is less than about 15 and a magnitude of bt1*-bt2* is less than about 10.

6. The optical film of claim 1, wherein for each angle of incidence in the incident angle range and in the transition wavelength range, the optical film and the plurality of polymeric second layers have respective average optical transmittances Tt and Tt2, wherein:
 for at least one angle in the incident angle range, Tt is less than Tt2 by at least 10%; and
 in the incident angle range, a maximum variation of Tt is less than a maximum variation of Tt2 by at least 5%.

7. The optical film of claim 1, wherein the inorganic material comprises silver.

8. The optical film of claim 1, wherein the plurality of first layers comprises a plurality of alternating A and B layers, wherein, each of the A layers comprises the at least 30% by weight of the inorganic material.

9. An optical system comprising:
 a display comprising a plurality of light emitting pixels and configured to display an image for viewing by a viewer;
 an optical sensor disposed proximate the display;
 a lens film disposed between the display and the optical sensor and comprising a plurality of microlenses;
 a light absorbing layer disposed between the lens film and the optical sensor and defining a plurality of openings therein, the openings aligned to the microlenses in a one-to-one correspondence; and
 the optical film of claim 1 disposed between the display and the optical sensor.

10. The optical system of claim 9, wherein the optical sensor comprises a plurality of sensor pixels.

11. The optical system of claim 9 further comprising a first bonding layer bonding the optical film to the light absorbing layer and a second bonding layer bonding the optical film to the optical sensor.

12. The optical system of claim 9, wherein at least one of the light emitting pixels is configured to emit light propagating toward and incident on a finger of the viewer, the optical sensor configured to at least sense a presence of the finger by receiving at least a portion the incident light after it is reflected by the finger.

13. The optical system of claim 9, wherein the plurality of light emitting pixels comprises a plurality of organic light emitting pixels.

14. An optical system comprising:
 a display comprising a plurality of light emitting pixels and configured to display an image for viewing by a viewer;
 an optical sensor disposed proximate the display;
 a light absorbing layer disposed between the lens film and the optical sensor and defining a plurality of optically transparent openings therein; and
 an optical construction disposed between the light absorbing layer and the optical sensor and comprising:
 a plurality of first layers numbering N1 in total, N1 greater than 2 and less than 50; and
 a plurality of polymeric second layers numbering N2 in total, N2-N1>10, each of the first and second layers having an average thickness of less than about 500 nm, each of at least 30% of the first layers comprising at least 30% by weight of an inorganic material, such that for an incident light incident in an incident plane, optical transmittances of each of the plurality of polymeric second layers and the optical construction versus wavelength comprises a band edge that is within a same transition wavelength range that is between about 50 nm and 400 nm wide as the incident angle increases from about zero degree to at least about 50 degrees, wherein for at least a same first wavelength in the transition wavelength range and a same first incident angle of greater than about 40 degrees, the plurality of polymeric second layers and the optical construction have respective optical transmittances T1 and T2, T2 less than T1 by at least 20%.

15. The optical system of claim 14, wherein the light absorbing layer comprises a plurality of alternating light absorbing and light transmissive regions, each of the light transmissive regions comprising a corresponding one of the optically transparent openings, the light transmissive regions having an average height H along a thickness direction of the light absorbing layer and an average largest lateral dimension W along a width direction of the light absorbing layer orthogonal to the thickness direction, $H/W \geq 0.5$.

* * * * *